United States Patent [19]
He

[11] Patent Number: 5,268,580
[45] Date of Patent: Dec. 7, 1993

[54] BAR CODE ENHANCEMENT SYSTEM AND METHOD FOR VISION SCANNERS

[75] Inventor: Duanfeng He, Duluth, Ga.

[73] Assignee: NCR Corporation, Dayton, Ohio

[21] Appl. No.: 939,219

[22] Filed: Sep. 2, 1992

[51] Int. Cl.$^5$ .............................................. G06K 7/10
[52] U.S. Cl. .................................. 250/566; 235/462; 382/50
[58] Field of Search ................ 250/566; 235/462, 494; 382/50–53

[56] References Cited

U.S. PATENT DOCUMENTS

| 4,509,195 | 4/1985 | Nadler | 382/51 |
| 4,901,365 | 2/1990 | Kelland | 382/61 |
| 4,992,955 | 2/1991 | Yabuuchi et al. | 382/50 |
| 5,026,974 | 6/1991 | Franklin et al. | 235/449 |
| 5,063,607 | 11/1991 | FitzHenry et al. | 382/53 |
| 5,086,484 | 2/1992 | Katayama et al. | 382/50 |
| 5,101,440 | 3/1992 | Watanabe et al. | 382/22 |
| 5,128,528 | 7/1992 | Heninger | 235/494 |

Primary Examiner—David C. Nelms
Assistant Examiner—S. B. Allen
Attorney, Agent, or Firm—Paul W. Martin

[57] ABSTRACT

A bar image enhancement system and method for vision scanners which divides an image of an article having a bar code label into groups of pixels, with each pixel having an intensity value, and which minimizes processing time by employing simple algebra. The system includes a camera for generating an analog signal representing the image. Processing circuitry converts the analog signal into a digital signal. A controller divides the image into groups, determines a contrast value for predetermined groups by subtracting the minimum intensity value from the maximum intensity of each group.

19 Claims, 4 Drawing Sheets

BAR CODE ENHANCEMENT SYSTEM AND METHOD FOR VISION SCANNERS

BACKGROUND OF THE INVENTION

The present invention relates to image detection methods, and more specifically to a bar code image enhancement system and method for vision scanners, or devices which electronically capture an image of an item containing a bar code label and decode the bar code label from the image.

Bar code labels are widely used on merchandise items to encode price and item information for efficient checkout. Bar code labels often present the highest contrast and contain the sharpest edges in images produced by vision scanners.

Bar code label decoding involves the steps of locating and decoding. The step of locating involves determining the existence of a bar code label and then determining its location and orientation. To locate a bar code label in an image, an edge detection enhancement process may be performed, based on the fact that bar code labels contain sharp edges.

A discussion of popular edge enhancement methods can be found in the books "Digital. Image Processing" by W. K. Pratt, Wiley, New York, 1978; "Digital. Image Processing" by Gonzales and Wintz,. Addison-Wesley, London, 1977; and "Techniques for. Image Processing and Classification in Remote Sensing" by R. A. Schowengertt,. Academic Press, Orlando, 1983. These books are hereby incorporated by reference.

Edge enhancement methods are typically complex. They usually employ convolutions or transforms to enhance the high frequency elements in an image. Use of convolutions necessarily involves long integer operations as well as many multiplication operations. Use of transforms involves floating point arithmetic, which is also computationally intense. Schowengertt teaches a simple method involving absolute value calculations. Although the absolute value method is simpler than other known methods, it does not produce results which are as good as the other methods.

Therefore, it would be desirable to provide a bar code edge image enhancement method which is computationally simple, but which works as well as known image processing methods.

SUMMARY OF THE INVENTION

In accordance with the teachings of the present invention, a bar code image enhancement system and method for vision scanners is provided. The system includes a camera for generating analog signals representing an image of an article having a bar code label. The image includes a grid having a predetermined number of pixels, with each pixel having an intensity value representing the average brightness within an area of the object. The bar code label occupies a region having a relatively large contrast value. Processing circuitry converts the analog signals into digital signals and stores them within a random access memory (RAM). A controller divides the image into groups having a predetermined number of pixels, and determines a contrast value for any group it finds necessary, as determined by the bar code search algorithm.

The method of the present invention begins by generating an image of an article having a bar code label. The image includes a grid having a predetermined number of pixels, with each pixel having an intensity value. The image is divided into groups of pixels, with each group having a predetermined number of pixels. Upon demand, a contrast value is determined for predetermined groups. Finally, the contrast values are employed to locate and decode the bar code label.

It is accordingly an object of the present invention to provide a bar code image enhancement system and method for vision scanners.

It is another object of the present invention to provide a bar code image enhancement system and method for vision scanners which divides an image of an article having a bar code label into groups of pixels, and which provides a contrast value for any group requested by the controller.

It is another object of the present invention to provide a bar code image enhancement system and method for vision scanners which minimizes processing time by utilizing the intensity values of a predetermined number of pixels less than the number of pixels within each group.

It is yet another object of the present invention to provide a bar code image enhancement system and method for vision scanners which produces contrast values only for non-overlapping groups of pixels, and which thereby reduces the size of the resultant image and speeds up the enhancement process.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
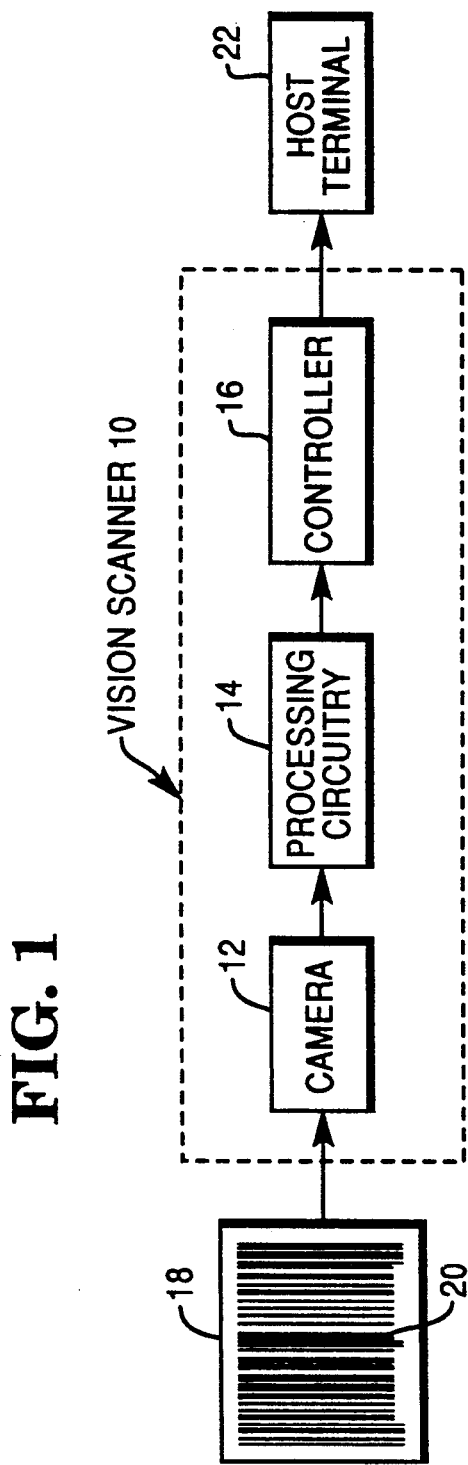
FIG. 1 is a block diagram of a vision scanner.

Referring now to FIG. 1, vision scanner 10 includes camera 12, processing circuitry. 14, and controller 16. Camera. 12 produces an analog signal based on the intensity of an image collected from an article 18 having a bar code label 20 to be scanned. Preferably, camera 12 is a solid state camera containing a focal plane array, such as a charge coupled device (CCD) camera Processing circuitry 14 converts the analog signal into a digital signal and stores the signal in a random access memory (RAM).

Controller 16 executes programming which locates and decodes bar code labels, and passes decoded bar code information to host terminal 22. The programming includes a scanning routine which employs the edge detection method of the present invention. The scanning routine may additionally contain a digital filtering step for reducing the size of the image, and a search step which applies a predetermined search routine to locate bar code information.

Figure 2:
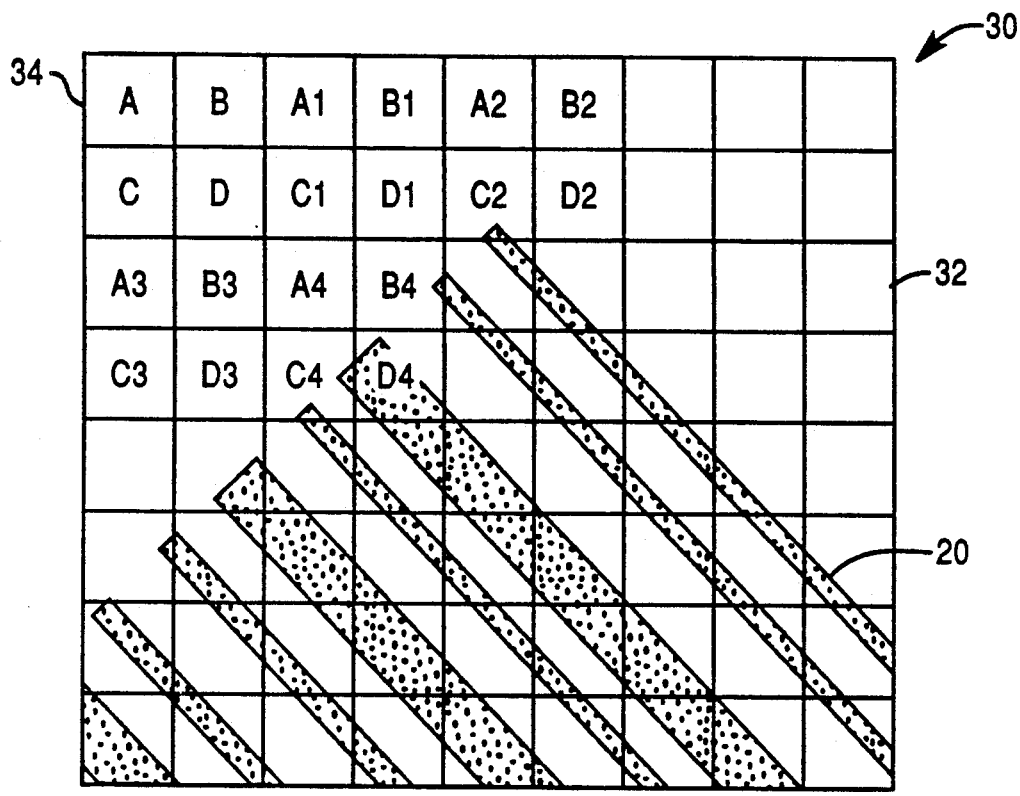
FIG. 2 is a view of a digital image containing pixels, some of the pixels being divided into groups of four, and a bar code label.

Turning now to FIG. 2, digital image 30 from camera 12 is divided into pixels 32, where a pixel is an element in the digital image of an object representing a squared area of the object. Each pixel contains light intensity information for the area of the image it represents. The difference in intensity between neighboring pixels is called "contrast". Pixels are processed in groups 34.

Under a first embodiment of the method of the present invention, three pixels out of a group of four pixels, here shown as a 2×2 group, are examined at one time for contrast. The use of at least three squares ensures that the bar code will not be overlooked during search. Thus, for example, to obtain the contrast of a particular group containing value. A, the following formula is used:

$$\text{contrast} = \text{Max}(A, B, C) - \text{Min}(A, B, C) \quad (1)$$

where "Max" represents the largest number among the three pixels and "Min" represents the smallest number among the three pixels.

Figure 3:
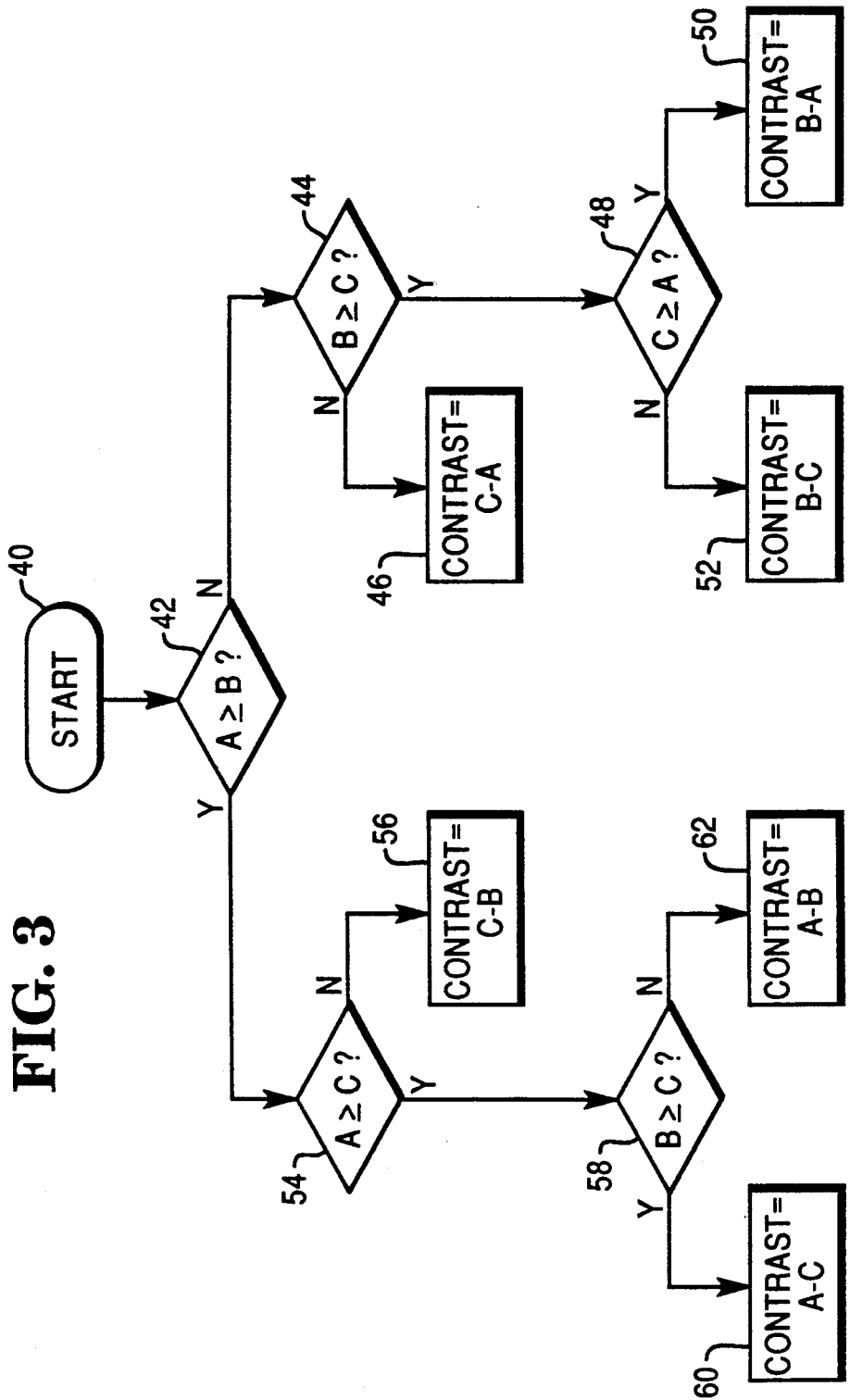
FIG. 3 is a flow diagram for calculating contrast for the first group of pixels given in FIG. 2.

Turning now to FIG. 3, one way of calculating contrast is shown in detail, beginning with START 40. In block 42, the routine asks whether. A is greater than or equal to B. If it is not, the routine proceeds to block 44, where the routine asks if B is greater than or equal to C. If B is less than C, then the difference quantity C-A is the contrast applied to the scanning routine in block 46.

If B is greater than or equal to C, then the routine asks if C is greater than or equal to. A in block 48. If C is greater than or equal to. A, then the difference quantity B-A is the contrast and is applied to the scanning routine in block 50. However, if C is less than. A, then the difference quantity B-C is the contrast and is applied to the scanning routine in block 52.

Returning now to block 42, if. A is greater than or equal to B, then the routine asks whether. A is greater than or equal to C in block 54. If. A is less than C, then the difference quantity C-B is the contrast applied to the scanning routine in block 56.

If A is greater than or equal to C, then the routine asks if B is greater than or equal to C in block 58. If B is greater than or equal to C, then the difference quantity. A-C is the contrast applied to the scanning routine in block 60. However, if B is less than C, then the difference quantity. A-B is the contrast applied to the scanning routine in block 62.

On average, equation (1) may take three and a half subtractions and two and a half comparisons to yield a value for contrast.

Returning now to FIG. 2, it is not necessary to include the value D in the calculation as given in equation (1). If a bar code label passes through pixel D, it necessarily passes through one of its nearest neighboring squares. Thus, in the present illustration, a bar code label passing through the square containing D will pass through at least one of squares containing. A, B, C, A1, C1, A3, B3, or A4. The bar code would be included if contrast were based on these other pixels. Besides, it is very important to use as few elements as possible out of a neighborhood when performing digital filtering so as to increase processing speed. The number of required calculations is at least proportional to the number of elements involved.

Advantageously, calculating in groups of four pixels effectively reduces the image size to a fourth of the original size. This reduction in size is usually performed in an additional stage, if conventional edge enhancement filtering methods are used.

Figure 4:
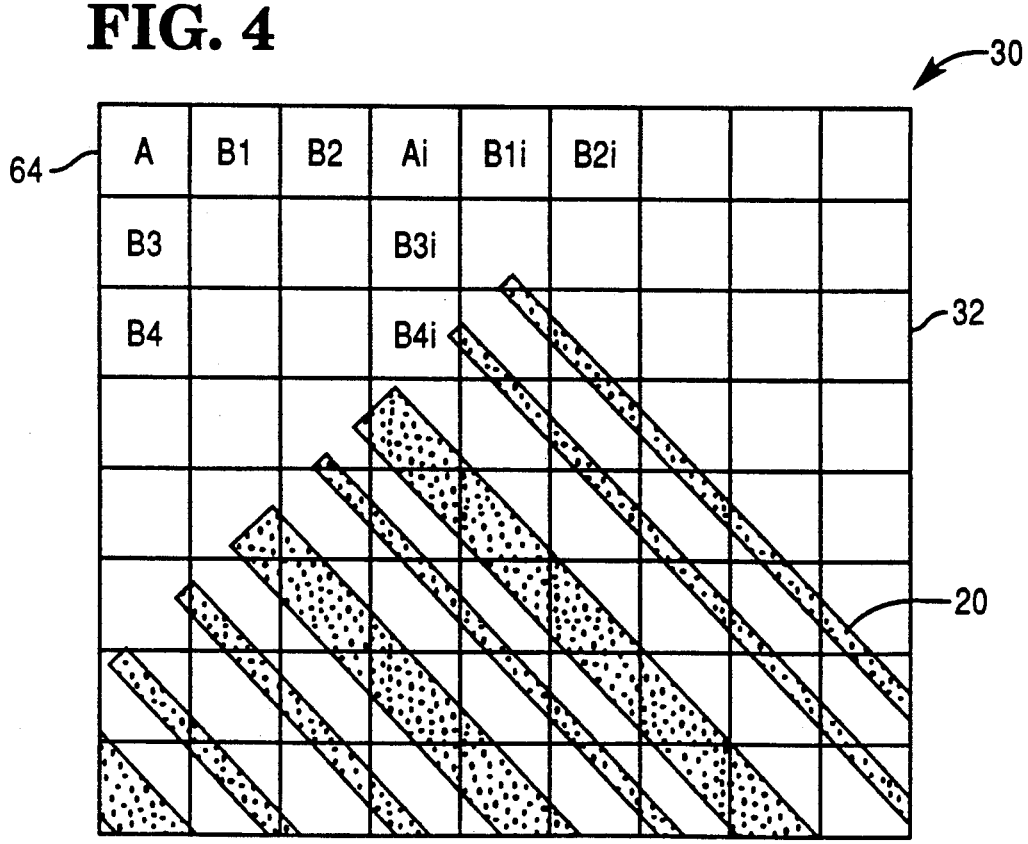
FIG. 4 is a view of a digital image containing pixels, some of the pixels being divided into groups of nine, and a bar code label.

Turning now to FIG. 4, a second embodiment of the present invention examines contrast in a group 64 having nine squares, here represented as a 3×3 group, using the following formula:

$$\text{contrast} = \text{Max}(A, B1, B2, B3, B4) - \text{Min}(A, B1, B2, B3, B4) \quad (2)$$

Figure 5:
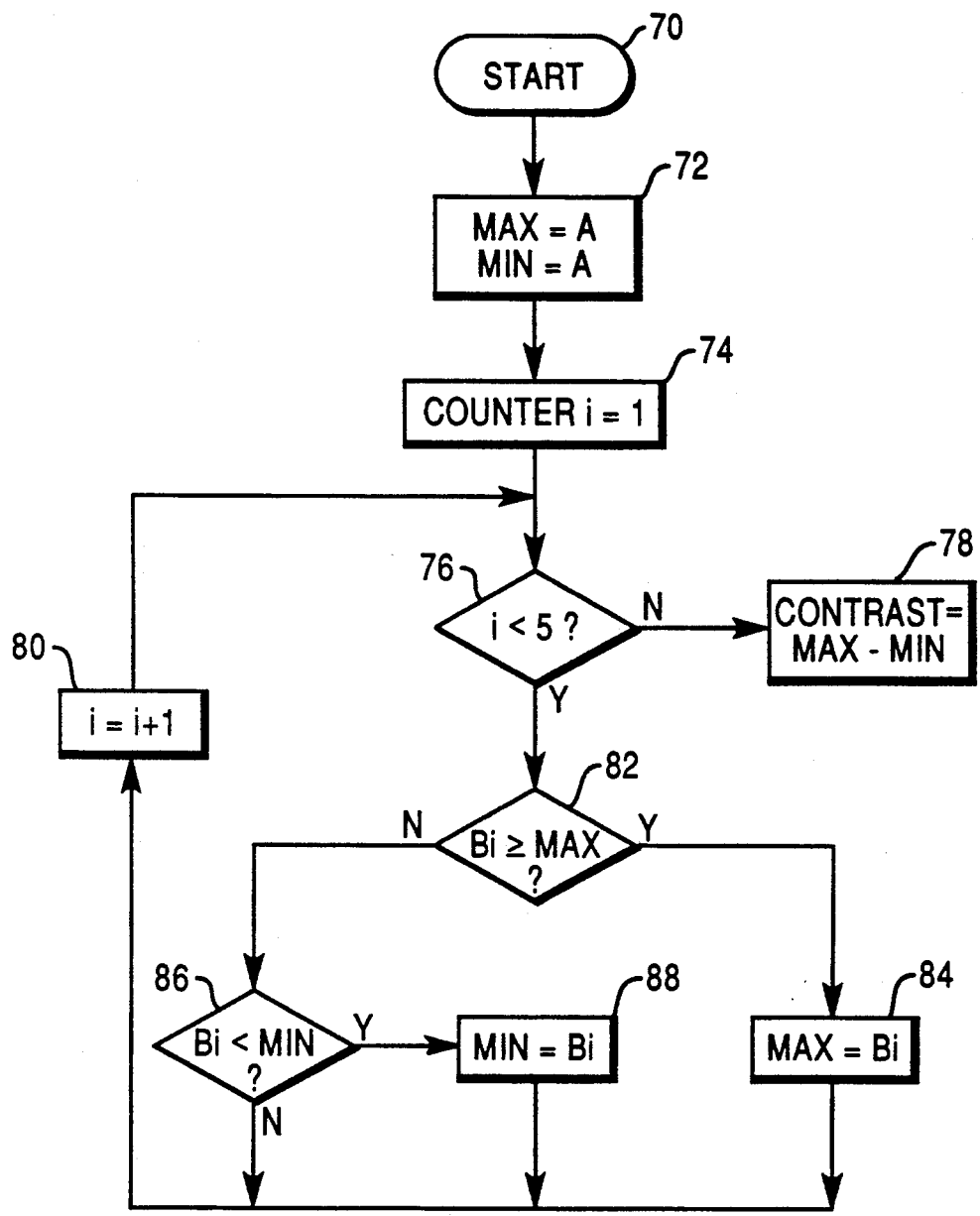
FIG. 5 is a flow diagram for calculating contrast for the first group of pixels given in FIG. 4.

A simple routine for determining contrast using equation (2) is shown in FIG. 5, beginning with START 70. In block 72, value. A is initialized to both maximum value MAX and minimum value MIN.

In block 74, counter i is initialized to one, where counter i resides in controller 16.

In block 76, the routine asks whether counter i is less than five. If so, then the routine asks whether the current value for Bi is greater than or equal to the maximum value MAX currently stored in memory. If so, then value Bi becomes the new maximum value MAX in block 82 and the routine proceeds to blocks 80 and 76, in which counter i is incremented by one.

Returning to block 82, if the current value Bi is less than the current maximum value MAX, then the routine asks whether value Bi is less than the current minimum value MIN in block 86. If so, then value Bi becomes the new value for minimum value MIN in block 86 and the routine proceeds to block 76 through block 88, in which counter i is incremented by one. If value Bi is greater than or equal to minimum value MIN in block 88, then the routine proceeds to blocks 80 and 76, in which counter i is incremented by one.

Returning to block 76, if counter i is greater than or equal to five, then contrast is equal to the difference between the current maximum value MAX and minimum value MIN in block 78.

Advantageously, searching in groups of nine squares effectively reduces the image size to a ninth of the original size. This reduction in size is usually performed in an additional stage, if conventional edge enhancement filtering methods are used.

Both the first and second embodiments may employ any predetermined search strategy. For example, one search strategy for the second embodiment might be to initially determine the contrast of every third row of groups (skipping two rows of a group at a time), and increasing that calculation to include additional rows of groups when some sign of the bar code is detected.

Although the present invention has been described with particular reference to certain preferred embodiments thereof, variations and modifications of the present invention can be effected within the spirit and scope of the following claims.

What is claimed is:

1. A bar code label edge enhancement system comprising:
    a camera for generating analog signals representing an image of an article having a bar code label, the image being divided into a grid having pixels, each pixel having an intensity value;
    processing means for converting the analog signals to digital signals; and
    controller means, coupled to the processing means, for dividing the image into groups having at first predetermined number of pixels, and for determining a contrast value for each group from the intensity values of a second predetermined number of pixels within each group.

2. The system as recited in claim 1, wherein the camera comprises a charge coupled device camera.

3. The system as recited in claim 1, wherein the first predetermined number of pixels within each group is four.

4. The system as recited in claim 3, wherein the group has two rows and two columns of pixels.

5. The system as recited in claim 4, wherein the second predetermined number of pixels comprises three.

6. The system as recited in claim 5, wherein the first predetermined number of pixels within each group is nine.

7. The system as recited in claim 6, wherein each group has three rows and three columns of pixels.

8. The system as recited in claim 7, wherein the second predetermined number of pixels comprises five.

9. A bar code label edge enhancement system comprising:
   a camera for generating analog signals representing an image of an article having a bar code label, the image being divided into a grid having a first predetermined number of pixels, each pixel having an intensity value;
   processing means for converting the analog signals to digital signals; and
   controller means, coupled to the processing means, for dividing the image into groups having four pixels, and for determining a contrast value for each group from the intensity values of three pixels in each group.

10. A bar code label edge enhancement system comprising:
    a camera for generating analog signals representing an image of an article having a bar code label, the image being divided into a grid having a predetermined number of pixels, each pixel having an intensity value;
    processing means for converting the analog signals to digital signals; and
    controller means, coupled to the processing means, for dividing the image into groups having nine pixels, and for determining a contrast value for each group from the intensity values of five pixels in each group.

11. A method for locating a bar code label comprising the steps of:
    generating an image of an article having a bar code label;
    dividing the image into a grid having pixels, each pixel having an intensity value;
    dividing the image into groups of pixels, each group having a first predetermined number of pixels; and
    determining a contrast value for a second predetermined number of groups of pixels.

12. The method as recited in claim 11, wherein the step of dividing comprises the substep of:
    assigning four pixels to each group.

13. The method as recited in claim 11, wherein the step of dividing comprises the substep of:
    assigning nine pixels to each group.

14. The method as recited in claim 12, wherein the step of determining comprises the substeps of:
    comparing the intensity values of the second predetermined number of pixels to determine maximum and minimum intensity values; and
    subtracting the minimum intensity value from the maximum intensity.

15. The method as recited in claim 13, wherein the step of determining comprises the substeps of:
    comparing the intensity values of the second predetermined number of pixels to determine maximum and minimum intensity values; and
    subtracting the minimum intensity value from the maximum intensity.

16. The method as recited in claim 14, wherein the second predetermined number of pixels is three.

17. The method as recited in claim 15, wherein the second predetermined number of pixels is five.

18. A method for locating a bar code label comprising the steps of:
    generating an image of an article having a bar code label;
    dividing the image into a grid having pixels, each pixel having an intensity value;
    dividing the image into groups of pixels, each group having four pixels;
    determining a contrast value for a predetermined number of groups of pixels, including the substeps of choosing three pixels within each group, comparing the intensity values of the chosen pixels to determine maximum and minimum intensity values, and subtracting the minimum intensity value from the maximum intensity.

19. A method for locating a bar code label comprising the steps of:
    generating an image of an article having a bar code label;
    dividing the image into a grid having pixels, each pixel having an intensity value;
    dividing the image into groups of pixels, each group having nine pixels;
    determining a contrast value for a predetermined number of groups of pixels, including the substeps of choosing five pixels within each group, comparing the intensity values of the chosen pixels to determine maximum and minimum intensity values, and subtracting the minimum intensity value from the maximum intensity.

* * * * *